United States Patent [19]

Iwata

[11] Patent Number: 4,639,809
[45] Date of Patent: Jan. 27, 1987

[54] MAGNETIC HEAD
[75] Inventor: Tetsuya Iwata, Koide, Japan
[73] Assignee: Alps Electric Co., Ltd., Japan
[21] Appl. No.: 671,634
[22] Filed: Nov. 15, 1984
[30] Foreign Application Priority Data
Nov. 16, 1983 [JP] Japan ............................ 58-176027[U]
[51] Int. Cl.$^4$ ............................ G11B 5/27; G11B 5/22
[52] U.S. Cl. .................................... 360/121; 360/118
[58] Field of Search ................................. 360/121, 118
[56] References Cited
U.S. PATENT DOCUMENTS
3,557,445 1/1971 Mizrahi ............................... 360/118
3,562,443 2/1971 Bos et al. ............................ 360/121
3,964,103 6/1976 Thompson et al. ................ 360/121

Primary Examiner—Robert S. Tupper
Attorney, Agent, or Firm—Guy W. Shoup

[57] ABSTRACT

A magnetic head comprising a recording/reproducing core is formed with a recording/reproducing gap at an intermediate portion of the tip end portion thereof, and a pair of erasing cores are arranged on either side of the tip end portion to sandwich the recording/reproducing core. The magnetic head is characterized in that a part of the tip end portion of the recording/reproducing core is made thinner than the other portion thereof and that the pair of erasing cores are arranged at the opposite sides of the thin portion.

3 Claims, 4 Drawing Figures it to cope with the narrow track by reducing the width of the thin portion 1d. The other portion of the recording/reproducing core 1 other than the thin portion 1d is made to have a thickness equal to or thicker than the thick portion 1c so that the recording/reproducing core 1 has sufficient mechanical strength.

MAGNETIC HEAD

BACKGROUND OF THE INVENTION

1. Field of the Invention

The present invention relates to a magnetic head for a magnetic disk recording/reproducing apparatus, and particularly to the improvement in the shape of a recording/reproducing core of a magnetic head for a magnetic disk recording/reproducing apparatus.

2. Description of Prior Art

FIGS. 1 and 2 show an arrangement of the prior art magnetic head.

FIG. 1 is an exploded perspective view in which reference numeral 1 designates a recording/reproducing core of a magnetic material such as ferrite, provided with a recording/reproducing gap 1a and a leg portion 1b. A pair of erasing cores 2 are provided at opposite sides of the recording/reproducing core 1 and each provided with a non-magnetic material 3 such as glass. A pair of core holders 4 of a non-magnetic material, such as ceramic, are provided with grooves 4a to which the erasing cores 2 are inserted. The pair of erasing cores 2 and the pair of core holders 4 are opposite to each other with the recording/reproducing core 1 sandwiched therebetween.

FIG. 2 is a plan view showing the state in which the above-mentioned members or elements are assembled. In assembling, the pair of erasing cores 2 are positioned and temporarily fixed such that an erasing gap 2a of a predetermined dimension is formed between the recording/reproducing core 1 and each of the pair of erasing cores 2, and then fixed with a bonding material such as glass. At this time the width $t_1$ of the tip end portion of the recording/reproducing core 1 corresponds to the track width of a magnetic disk.

Such a conventional magnetic head is arranged such that the recording/reproducing core 1 has a thickness which is uniform over the entire area, so that the tip end width $t_1$ thereof opposing to the magnetic disk is also uniform.

Recently it is required to further improve the storage density because of demands of higher speed and larger capacity for electronic computers or the like as they spread, and magnetic disks have been developed to have high density, by improving the storage mode from the single surface type to the both surface one, from the single density type to the double density one, further, by making the storage track narrower.

In the conventional magnetic magnetic head, to cope with the demands of higher density and narrower track, the thickness of the recording/reproducing core 1 has been reduced as thin as possible to make the tip end width $t_1$ smaller. However, the recording/reproducing core 1 had a uniform thickness all over the area and, therefore, there has been caused a drawback that the thinner the thickness of the recording/reproducing core 1 was made, the more the mechanical strength thereof was lowered.

SUMMARY OF THE INVENTION

An object of the present invention is therfore to eliminate the above-mentioned drawbacks in the prior art magnetic head.

Another object of the present invention is to provide a magnetic head which can be sufficiently cope with magnetic disks of high density and narrowed track and which has large mechanical strength.

According to an aspect of the present invention, the magnetic head having a recording/reproducing core formed with a recording/reproducing gap at an intermediate position of the tip end portion thereof, and a pair of erasing cores arranged so as to sandwich the recording/reproducing core therebetween, is featured in that a part of the tip end portion of the recording/reproducing core is made thinner than the other part of the same, and in that the erasing cores are arranged at the opposite sides of the thinner part.

Other objects, features, and advantages of the present invention will become more apparent from the following description in conjunction with the accompanying drawings.

DESCRIPTION OF PREFERRED EMBODIMENTS

Figure 1:
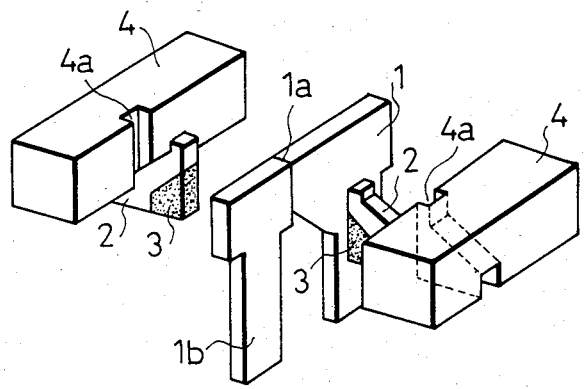
FIG. 1 is an exploded perspective view of the conventional magnetic head.
Figure 2:
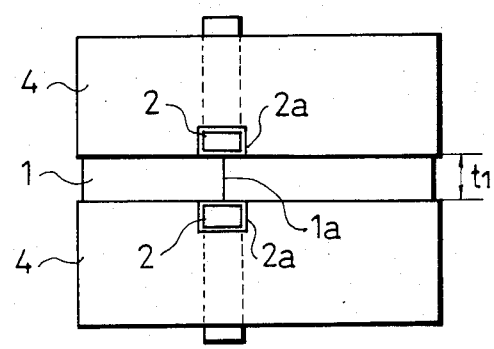
FIG. 2 is a plan view of the magnetic head of FIG. 1.
Figure 3:
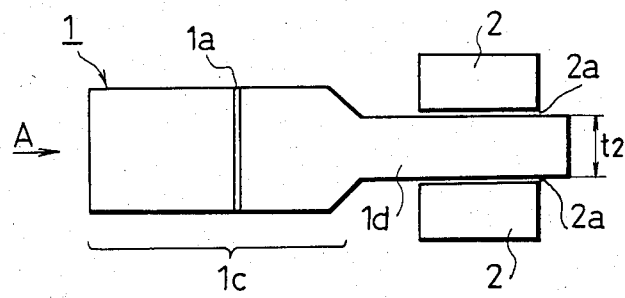
FIG. 3 is a plan view of a part of the magnetic head according to an embodiment of the present invention.
Figure 4:
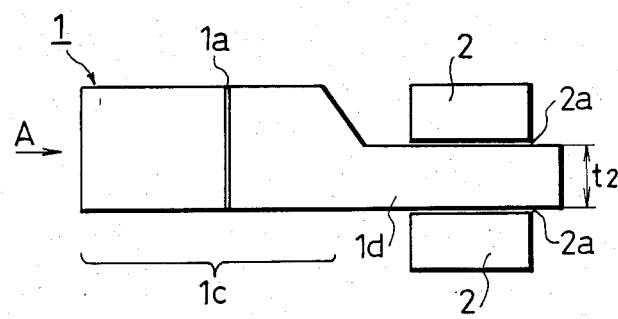
FIG. 4 is a plan view of a part of the magnetic head according to another embodiment of the present invention.

Referring to FIGS. 3 and 4, a preferred embodiment of the present invention will be described hereunder.

In FIG. 3 which is a plan view of a part of the magnetic head according to an embodiment of the present invention, the plan shape of the tip end portion of a recording/reproducing core 1 and the position of arrangement of a pair of erasing cores 2 are illustrated. The recording/reproducing core 1 is formed with a recording/reproducing gap 1a and having thick and thin portions 1c and 1d respectively. Reference numeral 2a designates an erasing gap.

In the embodiment according to the present invention, the width of the recording/reproducing core 1 which serves as a disk sliding surface is not uniform or even, as shown in FIG. 3. That is, the tip end portion of the recording/reproducing core 1 is such that the width of the thin portion 1d at the right hand in the drawing is thinner than the thick portion 1c in which the recording/reproducing gap 1a is formed, and the pair of erasing cores 2 are arranged at the opposite sides of this thin portion 1d. Since a magnetic disk is rotated in the direction of arrow A in the drawing, the track width corresponds to the width $t_2$ of the thin portion 1d. Thus, it is made possible to cope with the narrow track by reducing the width of the thin portion 1d. The other portion of the recording/reproducing core 1 other than the thin portion 1d is made to have a thickness equal to or thicker than the thick portion 1c so that the recording/reproducing core 1 has sufficient mechanical strength.

FIG. 4 is a plan view showing a part of the magnetic head according to another embodiment of the present invention, in which a part corresponding to that of FIG. 3 is represented by the same reference numeral used in FIG. 3. In this embodiment, the thick portion 1c and the thin portion 1d of the recording/reproducing core 1 are made even at one side surface of the core 1.

As described above, according to the present invention, a part of the tip end of the recording/reproducing core is made thin and a pair of erasing cores are arranged at the opposite sides of the thin portion of the recording/reproducing core, so that not only it is made possible to cope with a magnetic disk having high density and narrowed tracks but it is possible to form the portion other than the thin portion to be relatively thick, whereby the mechanical strength of the recording/reproducing core is not reduced and there occurs no trouble in handling and assembling.

I claim:

1. In a magnetic head comprising a recording/reproducing core having a tip end portion of a generally elongated rectangular shape extending in a longitudinal direction which a magnetic media is moved relative to said tip end portion, said tip end portion having a recording/reproducing gap formed at a position intermediate its ends along said longitudinal direction, and a pair of erasing cores arranged opposing each other in a direction transverse to said longitudinal direction with each erasing core disposed adjacent a respective side of said tip end portion in said transverse direction, the improvement wherein said tip end portion has an upstream (relative to said longitudinal direction of movement of said magnetic media) portion including said gap which is provided with a given thickness in the transverse direction suitable for a desired mechanical strength property, and a downstream portion parallel to said upstream portion which is thinner compared to said given thickness so as to be suitable for a higher density recording property, and said erasing cores are arranged on opposite sides of said downstream portion of reduced thickness.

2. A magnetic head according to claim 1, in which said downstream portion is reduced in its thickness at each of the opposite sides of the tip end portion thereof to form said thinner portion.

3. A magnetic head according to claim 1, in which the said downstream portion is reduced in its thickness at one of the opposite sides at the tip end portion thereof to form said thinner portion.

* * * * *